United States Patent
Chen

(10) Patent No.: US 9,304,567 B2
(45) Date of Patent: Apr. 5, 2016

(54) SERVER AND POWER CHIP DETECTING METHOD

(71) Applicant: ScienBiziP Consulting (Shen Zhen) Co., Ltd., Shenzhen (CN)

(72) Inventor: Zhen-Yu Chen, Shenzhen (CN)

(73) Assignee: ScienBiziP Consulting(Shenzhen)Co., Ltd., Shenzhen (CN)

( * ) Notice: Subject to any disclaimer, the term of this patent is extended or adjusted under 35 U.S.C. 154(b) by 224 days.

(21) Appl. No.: 14/141,768

(22) Filed: Dec. 27, 2013

(65) Prior Publication Data

US 2014/0359336 A1    Dec. 4, 2014

(30) Foreign Application Priority Data

Jun. 3, 2013    (CN) .......................... 2013 1 02158392

(51) Int. Cl.
*G06F 1/28* (2006.01)
(52) U.S. Cl.
CPC ......................... *G06F 1/28* (2013.01)
(58) Field of Classification Search
CPC ....................................................... G06F 1/28
See application file for complete search history.

(56) References Cited

U.S. PATENT DOCUMENTS

| 4,951,171 | A * | 8/1990 | Tran | G06F 1/30 340/660 |
| 6,204,706 | B1 * | 3/2001 | Horvath | G06F 1/28 327/143 |
| 7,809,964 | B1 * | 10/2010 | Strickland | G11B 33/127 710/15 |
| 2012/0137159 | A1 * | 5/2012 | Chin | G06F 1/26 713/340 |

\* cited by examiner

*Primary Examiner* — Stefan Stoynov
(74) *Attorney, Agent, or Firm* — Novak Druce Connolly Bove + Quigg LLP

(57) ABSTRACT

A power chip detecting device, applied in a server, includes a power chip, a power sequence control module, a base management controller, a GPIO module, and a signal detecting module. The power sequence control module sends an initial power enable signal to the power chip after the server is switched on, and the power sequence control module receives an initial power good signal from the power chip after the power chip receives the initial power enable signal. The signal detecting module sends a time abnormal result to the GPIO module after determining that time difference between sending out of the initial power enable signal and the initial power good signal is less than a reference value. The GPIO module sends the time abnormal result to the base management controller.

8 Claims, 2 Drawing Sheets

SERVER AND POWER CHIP DETECTING METHOD

BACKGROUND

1. Technical Field

The present disclosure generally relates to a server and a detecting method for a power chip.

2. Description of Related Art

Server power up sequence is very important for a server. The server detects the server power up sequence by detecting a power good signal. The power good signal is sent by a power chip. However, if the power good signal is abnormal, the power chip cannot be determined to be abnormal.

BRIEF DESCRIPTION OF THE DRAWINGS

Many aspects of the embodiments can be better understood with parameters to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like parameters indicate similar elements. It should be noted that parameters to "an" or "one" embodiment in this disclosure are not necessarily to the same embodiment, and such parameters mean "at least one."

Figure 1:
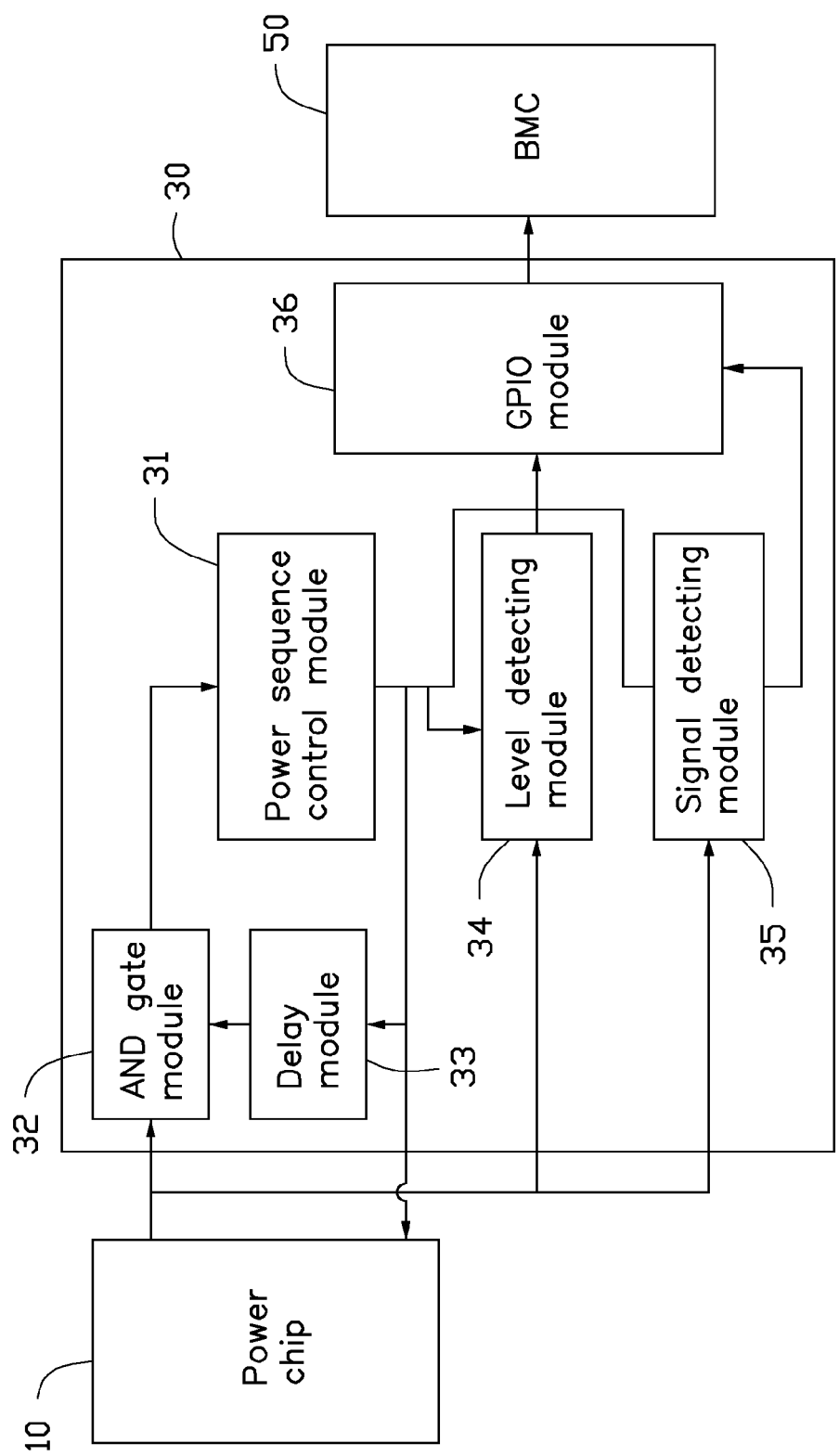
FIG. 1 is a schematic view of one embodiment of a server.

FIG. 1 shows a server of one embodiment. The server includes a power chip 10, a programmable logic device (PLD) 30, and a base management controller (BMC) 50. In one embodiment, the PLD 30 is complex programmable logic device.

The power chip 10 supplies power to other components, such as, CPU, hard devices, and the like.

The PLD 30 includes a power up sequence control module 31, a AND gate module 32, a delay module 33, a level detecting module 34, a signal detecting module 35, a general purpose input/output module (GPIO) module 36.

The power up sequence control module 31 is configured to send an initial power enable signal to the power chip 10 and the delay module 33 after the server is switched on. The power chip 10 is configured to send an initial power good signal to the AND gate module 32 after receiving the initial power enable signal. The delay module 33 delays the initial power enable signal and sends it to the AND gate module 32. The AND gate module 32 sends an adjusted power good signal to the power sequence control module 31 when the initial power good signal and the delayed power enable signal are high level. The power sequence control module 31 sends the initial power enable signal to next power chip (not shown) after receiving the adjusted power good signal.

The level detecting module 34 is configured to detect if the initial power good signal and the initial power enable signal are both high level.

The signal detecting module 35 is configured to detect if time difference between the sending out of the power enable signal and the initial power good signal is less than a reference value. If so, the initial power signal and the power chip are determined to be abnormal, and the signal detecting module 35 sends a time abnormal result to the BMC 50 via the GPIO module 36. The BMC 50 displays the time abnormal result on a display (not shown).

Figure 2:
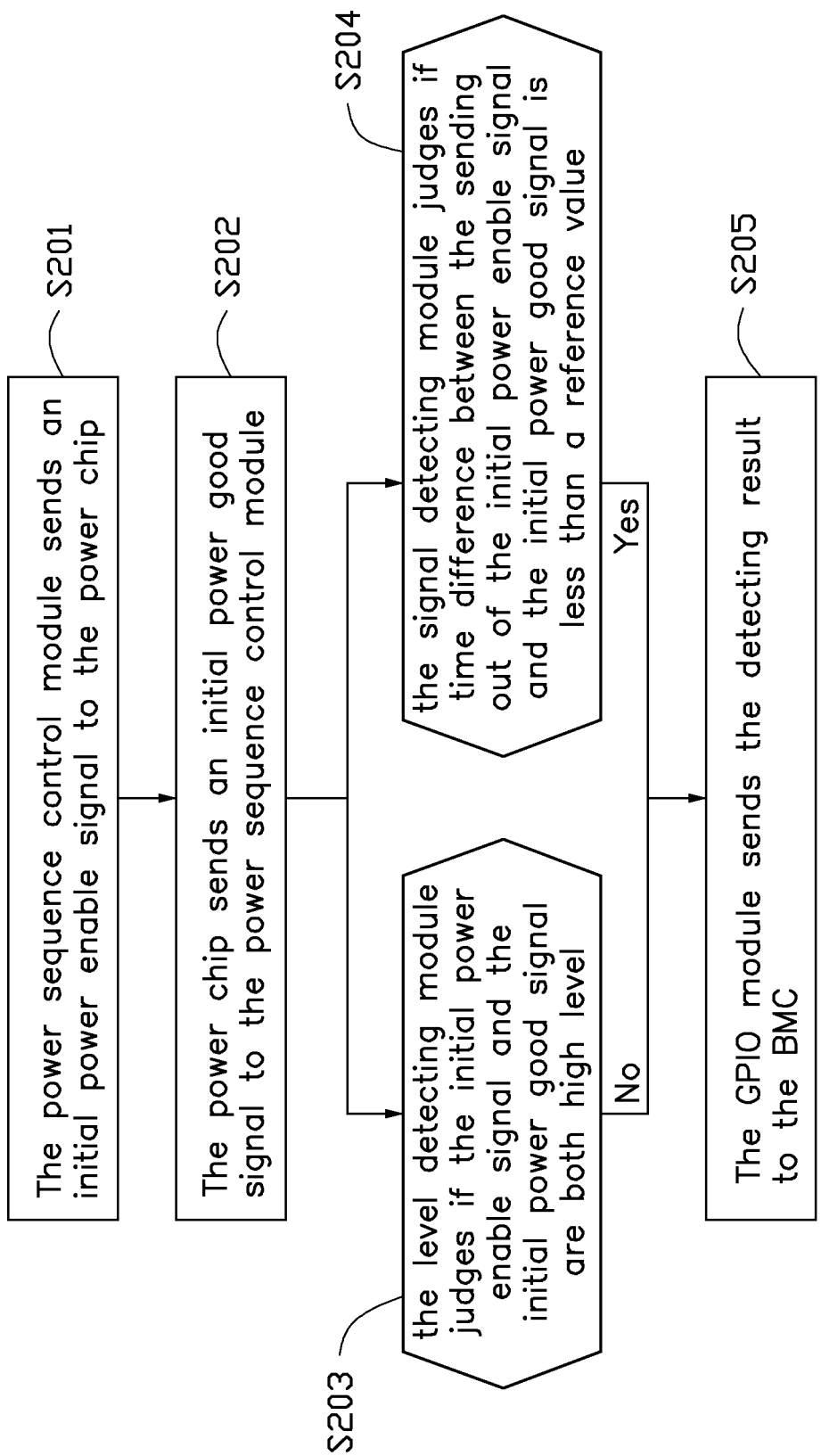
FIG. 2 is a flowchart of one embodiment of a power chip detecting method.

FIG. 2 shows that a power chip detecting method of the embodiment includes the following steps.

In step S201, the power sequence control module 31 sends an initial power enable signal to the power chip 10.

In step S202, the power chip 10 sends an initial power good signal to the power sequence control module 31 after receiving the initial power enable signal.

In step S203, the level detecting module 34 determines if the initial power enable signal and the initial power good signal are both high level; if not, the level detecting module 34 sends a level abnormal result to the GPIO module 36.

In step S204, the signal detecting module 35 determines if time difference between the sending out of the initial power enable signal and the initial power good signal is less than a reference value. If so, the signal detecting module 35 determines that the initial power good signal is abnormal and sends a time abnormal result to the GPIO module 36.

In step S205, the GPIO module 36 sends the abnormal result to the BMC 50, and the BMC 50 displays the abnormal results on a display.

It is to be understood, however, that even though numerous characteristics and advantages of the embodiments have been set forth in the foregoing description, together with details of the structure and function of the embodiments, the disclosure is illustrative only, and changes may be made in detail, especially in the matters of shape, size, and arrangement of parts within the principles of the present disclosure to the full extent indicated by the broad general meaning of the terms in which the appended claims are expressed.

What is claimed is:

1. A server, comprising:
   a power chip;
   a power sequence control module, the power sequence control module is configured to send an initial power enable signal to the power chip after the server is switched on, and the power sequence control module is configured to receive an initial power good signal from the power chip after the power chip receives the initial power enable signal;
   a base management controller;
   a GPIO module; and
   a signal detecting module, the signal detecting module is configured to send a time abnormal result to the GPIO module after determining that time difference between sending out of the initial power enable signal and the initial power good signal is less than a reference value;
   wherein the GPIO module is configured to send the time abnormal result to the base management controller.

2. The server of claim 1, further comprising a delay module and an AND gate module, wherein the power sequence control module is further configured to send the initial power enable signal to the delay module when sending the initial power enable signal to the power chip; the delay module is configured to delay the initial power enable signal and send a delayed power enable signal to the AND gate module; the power chip is configured to send the initial power good signal to the AND gate module; and the AND gate module is configured to send an adjusted power good signal to the power sequence control module when the initial power good signal and the delayed power enable signal are both high level.

3. The server of claim 1, further comprising a level detecting module, wherein the level detecting module is configured to send a level abnormal result to the GPIO module after judging that the levels of the initial power enable signal and the initial power good signal are abnormal; and the GPIO module is configured to send the level abnormal result to the base management controller.

4. The server of claim 1, wherein the power sequence control module, the signal detecting module, and the GPIO module are involved in a programmable logic device.

5. A power chip detecting method, applied in a server, comprising:
   providing a power chip detecting device, the power chip detecting device comprises a power chip, a power sequence control module, a signal detecting module, and a GPIO module, and a base management controller;
   sending, by the power sequence control module, an initial power enable signal to the power chip after the server is switched on;
   sending, by the power chip, an initial power good signal to the power sequence control module after the power chip receives the initial power enable signal;
   sending, by the signal detecting module, a time abnormal result to the GPIO module after determining that time difference between sending out of the initial power enable signal and the initial power good signal is less than a reference value; and
   sending, by the GPIO module, the time abnormal result to the base management controller.

6. The power chip detecting method of claim 5, further comprising sending, by the power sequence control module, the initial power enable signal to a delay module when sending the initial power enable signal to the power chip; delaying, by the delay module, the initial power enable signal and sending a delayed power enable signal to an AND gate; sending, by the power chip, the initial power good signal to the AND gate; and
   sending, by the AND gate module, an adjusting power good signal to the power sequence control module when the initial power good signal and the delayed power enable signal are both high level.

7. The power chip detecting method of claim 5, further comprising sending the initial power enable signal and the initial power good signal to a level detecting module; sending, by the level detecting module, a level abnormal result to the GPIO module after judging that the initial power enable signal and the initial power good signal are abnormal; and sending, by the GPIO module, the level abnormal result to the base management controller.

8. The power chip detecting method of claim 5, wherein the power sequence control module, the signal detecting module, and the GPIO module are involved in a programmable logic device.

* * * * *